United States Patent
Johnson

(10) Patent No.: US 6,935,445 B2
(45) Date of Patent: Aug. 30, 2005

(54) BACK-UP STEERING SYSTEM FOR TRACK LAYING VEHICLES

(75) Inventor: Douglas Rene Johnson, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/696,841

(22) Filed: Oct. 30, 2003

(65) Prior Publication Data

US 2005/0092532 A1 May 5, 2005

(51) Int. Cl.$^7$ ............................................. B62D 11/04
(52) U.S. Cl. ...................... 180/6.3; 180/6.32; 180/6.24
(58) Field of Search .............................. 180/6.2, 6.24, 180/6.3, 6.32, 6.34, 6.4

(56) References Cited

U.S. PATENT DOCUMENTS

| | | | | |
|---|---|---|---|---|
| 3,603,424 | A | * | 9/1971 | Blood et al. .................. 180/6.3 |
| 3,877,537 | A | * | 4/1975 | Ohms et al. .................. 180/6.3 |
| 4,037,677 | A | * | 7/1977 | Koch .......................... 180/6.7 |
| 4,702,330 | A | * | 10/1987 | Vatter et al. ................ 180/6.2 |
| 4,949,823 | A | * | 8/1990 | Coutant et al. ............. 192/221 |
| 5,857,532 | A | * | 1/1999 | Satzler ....................... 180/6.2 |
| 5,975,224 | A | * | 11/1999 | Satzler ...................... 180/6.44 |
| 6,029,761 | A | * | 2/2000 | Gustafson et al. ........... 180/6.2 |
| 6,039,133 | A | * | 3/2000 | Zulu .......................... 180/6.64 |
| 6,216,806 | B1 | * | 4/2001 | Toms ......................... 180/6.2 |
| 6,527,070 | B2 | * | 3/2003 | Ryan .......................... 180/6.7 |

* cited by examiner

Primary Examiner—Lesley D. Morris
Assistant Examiner—L. Lum

(57) ABSTRACT

A back-up steering system is provided having a hydraulic pump, an accumulator, a mode control valve, a main solenoid valve, and a pair of back-up solenoid valves. The system is connected, to left and right service brakes. The hydraulic pump and the accumulator are both connected to a main hydraulic line. The main solenoid valve is connected to the main line, a common fluid sump, and the mode control valve. The back-up solenoid valves are each connected to the main line, the sump and the mode control valve. The service brakes are connected to the mode control valve. During normal operation the mode control valve is set so that the service brakes are in fluid communication with the mode control valve and the main solenoid valve. When the main solenoid valve is actuated the pump is in fluid communication with both service brakes for simultaneous actuation thereof, in response to operator induced braking. At this time the back-up solenoid valves are disconnected from the service brakes due to the position of the mode control valve. During back-up or emergency operation the mode control valve is set so that the service brakes are in fluid communication with the mode control valve and the back-up solenoid valves. The service brakes are selectively brought into fluid communication with the pump and/or accumulator via selective actuation of the back-up solenoid valves. By selectively actuating either the left or right service brake the vehicle can be steered even though the primary steering system is not functioning properly. At this time the main solenoid valve is effectively disconnected from the service brakes due to the position of the mode control valve. Electrical input to the various valves of the system is provided by the vehicle alternator and in the event of alternator failure, the valves are powered by the vehicle battery. Hydraulic fluid pressure is provided under normal conditions by the hydraulic pump and in the event of pump failure, the accumulator acts as a back-up to provide fluid pressure to the system.

21 Claims, 1 Drawing Sheet

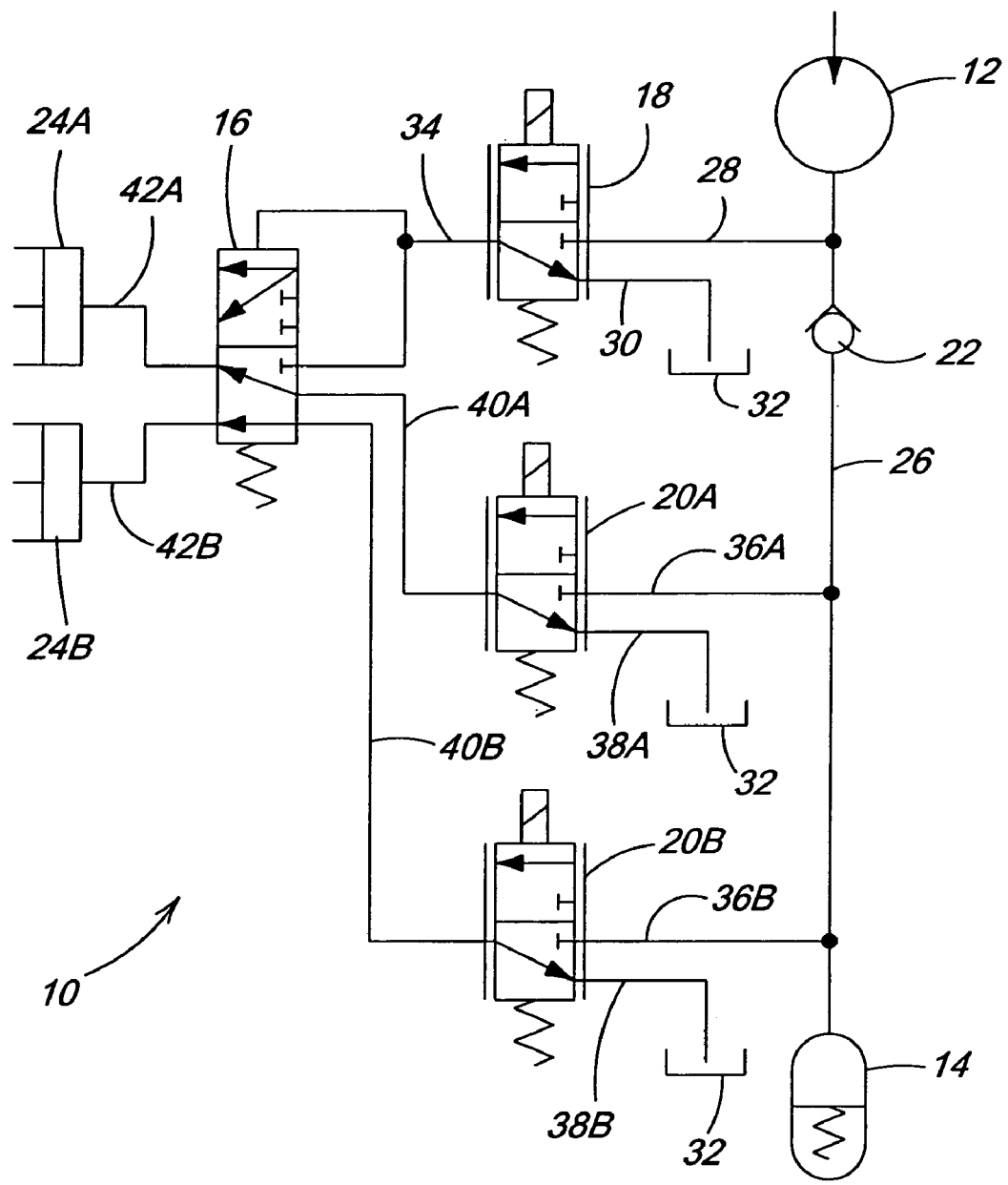

BACK-UP STEERING SYSTEM FOR TRACK LAYING VEHICLES

FIELD OF THE INVENTION

The present invention relates generally to track laying vehicles. More particularly, the present invention relates to steering systems for track laying vehicles. Specifically, the present invention relates to back-up or emergency steering systems for track laying vehicles.

BACKGROUND OF THE INVENTION

It is known to control the steering of track laying vehicles by selectively applying the brakes to one track or the other. However, new developments in drive train technology for track laying vehicles have made it possible to steer such vehicles during normal operation without relying on selective brake application. For example it is possible to steer a track laying vehicle through the use of a pair of infinitely variable transmissions (IVT) by varying the output ratio of an IVT connected to a first drive wheel relative to the output ratio of an IVT connected to another drive wheel. Such a system is highly effective in normal operation, however, in the event of a transmission failure this steering system might not be available. Some current track laying vehicle designs have a system by which the vehicle is steered in a straight line in the event of steering failure. Other track laying vehicles that travel at low speeds make no special provision for back up steering. However, various transportation regulations in place in some countries require that vehicle manufacturers provide some type of emergency or back-up steering means so that a vehicle can be steered in the event of such a steering system failure, until such time that the vehicle can be brought to a halt.

Accordingly, there is a clear need in the art for a back-up or emergency steering system for such track laying vehicles.

SUMMARY OF THE INVENTION

In view of the foregoing, it is an object of the invention to provide a back-up steering system for a track laying vehicle.

Another object of the invention is the provision of a steering system which is effective in the event of a transmission failure.

A further object of the invention is to provide such a system which is compatible with new steering technology such as dual infinitely variable transmissions.

The foregoing and other objects of the invention together with the advantages thereof over the known art which will become apparent from the detailed specification which follows are attained by a back-up steering system for a track laying vehicle comprising: a source of fluid pressure; a mode control valve; a main solenoid valve connected to the source of fluid pressure and the mode control valve; a pair of back-up solenoid valves each connected to the mode control valve and the source of fluid pressure; and, left and right service brakes connected to the mode control valve; wherein during normal operation the mode control valve is set so that the service brakes are in fluid communication with the mode control valve and the main solenoid valve so that when the main solenoid valve is actuated the source of fluid pressure is in fluid communication with both service brakes for simultaneous actuation thereof in response to operator induced braking, and during back-up or emergency operation the mode control valve is set such that the service brakes are in fluid communication with the mode control valve and the back-up solenoid valves so that the left and right service brakes are selectively brought into fluid communication with the source of fluid pressure via selective actuation of the back-up solenoid valves whereby the vehicle can be steered even though the primary steering system is not functioning properly.

In general, a back-up steering system is provided having a hydraulic pump, an accumulator, a mode control valve, a main solenoid valve, and a pair of back-up solenoid valves. The system is connected, to left and right service brakes. The hydraulic pump and the accumulator are both connected to a main hydraulic line. The main solenoid valve is connected to the main line, a common fluid sump, and the mode control valve. The back-up solenoid valves are each connected to the main line, the sump and the mode control valve. The service brakes are connected to the mode control valve. During normal operation the mode control valve is set so that the service brakes are in fluid communication with the mode control valve and the main solenoid valve. When the main solenoid valve is actuated the pump is in fluid communication with both service brakes for simultaneous actuation thereof, in response to operator induced braking. At this time the back-up solenoid valves are disconnected from the service brakes due to the position of the mode control valve. During back-up or emergency operation the mode control valve is set so that the service brakes are in fluid communication with the mode control valve and the back-up solenoid valves. The service brakes are selectively brought into fluid communication with the pump and/or accumulator via selective actuation of the back-up solenoid valves. By selectively actuating either the left or right service brake the vehicle can be steered even though the primary steering system is not functioning properly. At this time the main solenoid valve is effectively disconnected from the service brakes due to the position of the mode control valve. Electrical input to the various valves of the system is provided by the vehicle alternator and in the event of alternator failure, the valves are powered by the vehicle battery. Hydraulic fluid pressure is provided under normal conditions by the hydraulic pump and, in the event of pump failure, the accumulator acts as a back-up to provide fluid pressure to the system.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 is a schematic view of a back-up steering system hydraulic circuit according to the invention.

DESCRIPTION OF THE PREFERRED EMBODIMENT

With reference now to the drawing it can be seen that a back-up steering system according to the invention is designated generally by the numeral 10. As shown, the system 10 generally includes a source of fluid pressure such as a hydraulic pump 12 and/or an accumulator 14, a mode control valve 16, a main solenoid valve 18, and a pair of back-up solenoid valves 20A and 20B. The system 10 may further include a check valve 22. The system 10 is connected, as will be described in more detail below, to left and right service brakes 24A and 24B respectively. More particularly, the hydraulic pump 12 and the accumulator 14 are both connected to a main hydraulic line 26. The main solenoid valve 18 is connected via a line 28 to the main line 26 and via a line 30 to a common fluid sump 32. The main solenoid valve 18 is also connected to the mode control valve 16 by a line 34. The back-up solenoid valves 20A and 20B are each connected to the main line 26 by the lines 36A and 36B respectively, and to the sump 32 by the lines 38A and 38B respectively. Further, the back-up solenoid valves 20A and 20B are each connected to the mode control valve 16 via the lines 40A and 40B respectively. The left and right service brakes 24A and 24B are connected to the mode control valve 16 by way of the lines 42A and 42B respectively. The check valve 22 is located in the main line 26 between the accumulator 14 and the hydraulic pump 12 and more particularly between the junction of the lines 28 and 26 and the junction of the lines 36A and 26. Thus the accumulator 14 is isolated from the hydraulic pump 12 and the main solenoid valve 18 by the check valve 22.

During normal operation the mode control valve 16 is set by a spring force on the valve 16 and lack of pressure in line 34 so that the service brakes 24A and 24B are in fluid communication with lines 40A and 40B. Actuating the main solenoid 18 allows flow and pressure from the pump 12 to enter line 34. The pressure in line 34 moves the mode control valve 16 into a position to allow the service brakes 24A and 24B to be in fluid communication with line 34 and the main solenoid valve 18. Accordingly, when the main solenoid valve 18 is actuated the pump 12 is in fluid communication with both service brakes 24A and 24B for simultaneous actuation thereof, in response to operator induced braking. At this time the back-up solenoid valves 20A and 20B are effectively disconnected from the service brakes 24A and 24B due to the position of the mode control valve 16. During back-up or emergency operation there is no pressure in line 34 and a spring in the mode control valve 16 sets the mode control valve 16 so that the service brakes 24A and 24B are in fluid communication with the lines 40A and 40B respectively between the mode control valve 16 and the back-up solenoid valves 20A and 20B. Accordingly, the left and right service brakes 24A and 24B are selectively brought into fluid communication with the pump 12 and/or accumulator 14 via selective actuation of the back-up solenoid valves 20A and 20B respectively. Thus, by selectively actuating either the left or right service brake 24A or 24B the vehicle can be steered even though the transmission or primary steering system is not functioning properly. At this time the main solenoid valve 18 is effectively disconnected from the service brakes 24A and 24B due to the position of the mode control valve 16. When not actuated the main solenoid valve 18 is positioned such that the line 34 and thus mode control valve 16 are in communication with the fluid sump 32 via the line 30 so that fluid is recirculated through the system 10. Similarly, when the back-up solenoid valves 20A and 20B are not actuated the lines 40A and 40B are connected to the sump 32. It is contemplated that the main solenoid valve 18, and the back-up solenoid valves 20A and 20B are all electronically actuated while the mode control valve 16 can either be purely hydro-mechanical as shown in the schematic or can be actuated electronically in response to signals from appropriate sensors that have detected a failure of the primary steering system. Further, the back-up solenoids 20A and 20B can be electronically linked to a steering wheel or other appropriate steering input device so that back-up or emergency steering can be accomplished in a normal way, although it is possible to link the back-up solenoid valves 20A and 20B to individual brake pedals. The main solenoid valve 18 can likewise be electronically or mechanically linked to a brake pedal or other appropriate braking input device so that braking during normal operation is accomplished in a normal way. It is further contemplated that even during back-up or emergency steering mode the vehicle can be stopped by normal foot pedal braking. This can be accomplished in various ways, for example the back-up solenoid valves 20A and 20B could be linked to both the steering input device and the braking input device so that the service brakes 24A and 24B are individually applied in response to a steering input and simultaneously applied during a braking input. It is also possible that the mode control valve 16 can be linked to the braking input device so that the main solenoid 18 is brought into communication with the service brakes 24A and 24B in response to a braking input. Electrical input to the various valves of the system is provided under normal conditions by the vehicle alternator. In the event of alternator failure the valves can be powered by the vehicle battery. Similarly, hydraulic fluid pressure is provided under normal conditions by the hydraulic pump 12. In the event of pump failure the accumulator 14 acts as a back-up to provide fluid pressure to the system 10.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A back-up steering system for a track laying vehicle comprising:
    a source of fluid pressure;
    a mode control valve;
    a main solenoid valve connected to the source of fluid pressure and the mode control valve;
    a pair of back-up solenoid valves each connected to the mode control valve and the source of fluid pressure; and,
    left and right service brakes connected to the mode control valve; wherein during normal operation the mode control valve is set so that the service brakes are in fluid communication with the mode control valve and the main solenoid valve so that when the main solenoid valve is actuated the source of fluid pressure is in fluid communication with both service brakes for simultaneous actuation thereof in response to operator induced braking, and during back-up or emergency operation the mode control valve is set such that the service brakes are in fluid communication with the mode control valve and the back-up solenoid valves so that the left and right service brakes are selectively brought into fluid communication with the source of fluid pressure via selective actuation of the back-up solenoid valves whereby the vehicle can be steered even though a primary steering system is not functioning properly.

2. A back-up steering system for a track laying vehicle as described in claim 1 wherein the source of fluid pressure is a hydraulic pump.

3. A back-up steering system for a track laying vehicle as described in claim 1 wherein the source of fluid pressure is an accumulator.

4. A back-up steering system for a track laying vehicle as described in claim 1 wherein the source of fluid pressure is a hydraulic pump and an accumulator.

5. A back-up steering system for a track laying vehicle as described in claim 4 wherein the system further includes a check valve connected between the hydraulic pump and the accumulator.

6. A back-up steering system for a track laying vehicle as described in claim 5 wherein the accumulator is isolated from the hydraulic pump and the main solenoid valve by the check valve.

7. A back-up steering system for a track laying vehicle as described in claim 1 wherein the main solenoid valve is connected to a common fluid sump.

8. A back-up steering system for a track laying vehicle as described in claim 1 wherein the back-up solenoid valves are each connected to a common fluid sump.

9. A back-up steering system for a track laying vehicle as described in claim 7 wherein when not actuated the main solenoid valve is positioned such that the mode control valve is in fluid communication with the fluid sump so that fluid is recirculated through the system.

10. A back-up steering system for a track laying vehicle as described in claim 8 wherein when the back-up solenoid valves are not actuated they are connected to the common fluid sump.

11. A back-up steering system for a track laying vehicle as described in claim 1 wherein the mode control valve, the main solenoid valve, and the back-up solenoid valves are all electronically actuated.

12. A back-up steering system for a track laying vehicle as described in claim 1 wherein the mode control valve is hydro-mechanically actuated and the main solenoid valve and the back-up solenoid valves are electronically actuated.

13. A back-up steering system for a track laying vehicle as described in claim 12 wherein the mode control valve is actuated in response to hydraulic signals so as to change from normal mode to back up mode automatically.

14. A back-up steering system for a track laying vehicle as described in claim 11 wherein the mode control valve can be actuated in response to signals from appropriate sensors for detecting a failure of the primary steering system, thus making a mode change automatically.

15. A back-up steering system for a track laying vehicle as described in claim 1 wherein the back-up solenoids are linked to a steering input device.

16. A back-up steering system for a track laying vehicle as described in claim 1 wherein the back-up solenoid valves are linked to individual brake pedals.

17. A back-up steering system for a track laying vehicle as described in claim 15 wherein the main solenoid valve is linked to a braking input device.

18. A back-up steering system for a track laying vehicle as described in claim 17 wherein the back-up solenoid valves are linked to both the steering input device and the braking input device so that the service brakes are individually applied in response to a steering input and simultaneously applied during a braking input.

19. A back-up steering system for a track laying vehicle as described in claim 17 wherein the mode control valve is linked to the braking input device so that the main solenoid is brought into communication with the service brakes in response to a braking input.

20. A back-up steering system for a track laying vehicle as described in claim 11 wherein electrical input to the various valves of the system is provided under normal conditions by a vehicle alternator and in the event of alternator failure the valves are powered by a vehicle battery.

21. A back-up steering system for a track laying vehicle as described in claim 4 wherein hydraulic fluid pressure is provided under normal conditions by the hydraulic pump and in the event of pump failure the accumulator provides fluid pressure to the system.

* * * * *